(12) United States Patent
Jun et al.

(10) Patent No.: US 7,480,408 B2
(45) Date of Patent: Jan. 20, 2009

(54) DEGRADED DICTIONARY GENERATION METHOD AND APPARATUS

(75) Inventors: Sun Jun, Beijing (CN); Yutaka Katsuyama, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 727 days.

(21) Appl. No.: 11/200,194

(22) Filed: Aug. 10, 2005

(65) Prior Publication Data

US 2006/0056696 A1 Mar. 16, 2006

(30) Foreign Application Priority Data

Aug. 18, 2004 (CN) .................... 2004 1 0585882

(51) Int. Cl.
*G06K 9/34* (2006.01)
*G06K 9/46* (2006.01)
*G06K 9/68* (2006.01)

(52) U.S. Cl. ............................ 382/176; 382/190

(58) Field of Classification Search ............... 382/164, 382/172, 173, 176, 177, 181, 190, 218, 254, 382/260, 272, 276, 277; 707/3, 6; 358/3.22, 358/462, 466
See application file for complete search history.

(56) References Cited

U.S. PATENT DOCUMENTS

| | | | | |
|---|---|---|---|---|
| 5,854,853 A * | 12/1998 | Wang | .......................... | 382/176 |
| 6,298,151 B1 * | 10/2001 | Jodoin et al. | ................ | 382/176 |
| 6,453,069 B1 * | 9/2002 | Matsugu et al. | ............. | 382/173 |
| 6,493,463 B1 * | 12/2002 | Nagarajan et al. | ........... | 382/173 |
| 6,671,404 B1 * | 12/2003 | Kawatani et al. | ............ | 382/190 |
| 6,778,700 B2 * | 8/2004 | Karidi et al. | ................ | 382/176 |
| 6,782,129 B1 * | 8/2004 | Li et al. | ...................... | 382/176 |
| 6,856,697 B2 * | 2/2005 | Lee et al. | .................... | 382/177 |
| 7,079,686 B2 * | 7/2006 | Ahmed et al. | ............... | 382/176 |
| 7,142,716 B2 * | 11/2006 | Katsuyama et al. | ......... | 382/190 |

* cited by examiner

*Primary Examiner*—Amir Alavi
(74) *Attorney, Agent, or Firm*—Staas & Halsey LLP

(57) ABSTRACT

A method and apparatus for generating a degraded dictionary automatically is presented in this invention. Herein, a degraded pattern generating means generates a plurality of degraded patterns from an original character image, based on a plurality of degradation parameters. A degraded dictionary generating means generates a plurality of degraded dictionaries corresponding to the plurality of degradation parameters, based on the plurality of degradation patterns. Finally, a dictionary matching means selects one of the plurality of dictionaries which matches the degradation level of a test sample set best, as the final degraded dictionary. In this invention, various degraded patterns can be generated by means of simple scaling and blurring process for establishing degraded dictionaries. Therefore, the invention can be implemented simply and easily. The method and apparatus of the invention can not only be used in character recognition field, but also can be used in other fields such as speech recognition and face recognition.

12 Claims, 13 Drawing Sheets

Fig 7

DEGRADED DICTIONARY GENERATION METHOD AND APPARATUS

FIELD OF THE INVENTION

The presented invention relates to a method and apparatus for automatically generating degraded dictionary, more specifically to a method and apparatus for automatically generating degraded dictionary for optical character recognition.

DESCRIPTION OF RELATED ARTS

Degraded pattern and dictionary generation is very useful to optical character recognition (OCR). While current OCR engines perform well in recognizing relatively good quality characters, they perform poorly with respect to degraded characters. The reasons for the degradation of characters are very complicated. Scanning, faxing, video imaging, and so on, all will introduce different kinds of degradation to character patterns. Since most OCR engines are limited to recognize good quality character samples, the recognition rates for degraded character patterns are poor.

In order to improve the recognition performance for degraded character recognition, as well as improve the robustness of OCR engines, lots of degraded patterns are needed to augment the training data to revise the OCR dictionary. However, it is very costly and time consuming to collect plenty of real degraded patterns manually. Therefore, automatic pattern generation methods are very necessary.

Degraded pattern generation methods are reported in many papers and patents. Such as:

P. Sarkar, G. Nagy, J. Y. Zhou, et al. "Spatial Sampling of Printed Patterns," IEEE transactions on Pattern Analysis and Machine Intelligence 1998, v20, n3 pp. 344-351

T. Kanungo, R. M. Haralick, I. Phillips. "Global and Local Document Degradation Models," Proceedings of IAPR $2^{nd}$ International Conference on Document Analysis and Recognition, Tsukuba, Japan, 1993 pp. 730-734

H. S. Baird, "Generation and use of defective images in image analysis". U.S. Pat. No. 5,796,410.

These methods can generate various types of degraded character patterns by building different types of physical degradation models. A dictionary made from these synthetic degraded patterns is called a degraded dictionary.

In addition, there are many parameters in the degradation model, and different parameter values will generate degraded dictionaries with different degradation levels. Usually, only dictionaries that have the same degradation level as the real degraded samples are effective to improve the recognition performance. So, how to measure the similarity between synthetic degraded patterns and real degraded pattern is very important to real OCR application. This issue can also be regarded as a dictionary selection issue: i.e. how to select a dictionary from a group of dictionaries that best matches the degradation level of a given test sample set.

There are many applications of dictionary selection method. First, it can be used to improve OCR recognition performance. When recognizing large volume of degraded characters, if the degradation levels of these characters are similar, a small amount of test sample sets are enough to select the most suitable degraded dictionary, and then this dictionary is used to recognize the rest documents. This method can also be used for font type recognition, since different fonts can be regarded as different levels of degradation. If every font type has a corresponding dictionary, the dictionary selection method will select the dictionary whose font matches the font of the test sample.

Furthermore, if the test sample set contains more than one font type, many font recognition methods will fail. Therefore, how to detect multi-font environment effectively is also very important in real application.

SUMMARY OF INVENTION

The invention is presented aiming at disadvantages of the prior art. It is an object of the invention to provide a method and apparatus that can generate degraded dictionaries simply and effectively.

According to one aspect of the invention, a method for generating a degraded dictionary is provided which comprises the steps of: generating a plurality of degraded patterns from an original character image, based on different degradation parameters; establishing a plurality of degraded dictionaries which correspond to the plurality of degradation parameters, respectively, by extracting features of the degraded patterns; and selecting one of the plurality of dictionaries, which matches the degradation level of a test sample set best, as the final degraded dictionary.

Preferably, subject the original character image to a scaling process, subject the scaled character image to a blurring process, and subject the blurred image to a binarization process. Hence, degraded patterns can be generated simply.

In the invention, the scaling process and the blurring process can be conducted for more than one time.

Preferably, in the step of selecting the degraded dictionary, calculate mean recognition distances between each of the plurality of degraded dictionaries and a test sample set, based on features of the test sample set, and select one of the plurality of degraded dictionaries with the smallest mean recognition distance from the test sample set as the final degraded dictionary.

In the invention, a degradation level of the test sample set can also be determined based on the degradation level of the final degraded dictionary being selected.

Preferably, in the method of the invention, determine whether the test sample set is a single font environment, and select the final degraded dictionary by using the test sample set of single font environment.

Preferably, calculate mean recognition distances between each of the plurality of font dictionaries that have been prepared in advance and the test sample set, calculate mean recognition distances between the correctly recognized samples and each of the plurality of font dictionaries, and determine whether the test sample set includes only one font based on the above two mean recognition distances.

According to another aspect of the invention, an apparatus for establishing a degraded dictionary is provided which comprises: a degraded pattern generating means for generating a plurality of degraded patterns from an original character image, based on a plurality of degradation parameters; a degraded dictionary generating means for generating a plurality of degraded dictionaries corresponding to the plurality of degradation parameters, based on the plurality of degradation patterns; and a dictionary matching means for selecting one of the plurality of dictionaries which matches the degradation level of a test sample set best, as the final degraded dictionary.

Preferably, the degraded pattern generating means comprises: a scaling means for performing a scaling process for the original character image, and for performing a blurring process on the scaled character image, and a binarizing means for performing a binarization process for the scaled and blurred character image.

The scaling means performs scaling process for the character image for more than one time, and performs blurring process for the scaled character image for more than one time accordingly.

In the apparatus of the invention, it can further comprise a feature extracting means for extracting features from an input image pattern.

In the apparatus of the invention, it can further comprise a mean recognition distance calculating means for calculating a mean recognition distance between each of the plurality of degraded dictionaries and the test sample set, based on features of test samples extracted by the feature extracting means.

The dictionary matching means selects one dictionary with the smallest mean recognition distance from the test sample set as the final degraded dictionary.

By using the apparatus of the invention, a degradation level of the test sample set can be determined based on the degradation level of the final degraded dictionary being selected.

By using the apparatus of the invention, whether the test sample set includes only one font can be determined, based on mean recognition distances between each of the plurality of font dictionaries that have been prepared in advance and the test sample set, and mean recognition distances between the correctly recognized samples and each of the plurality of font dictionaries.

Preferably, the dictionary matching means selects the final degraded dictionary by using the test sample set of single font environment.

The method and apparatus of the invention can not only be used in character recognition field, but also be used in other fields such as speech recognition and face recognition. And it has the advantage of being implemented easily.

BRIEF DESCRIPTION OF THE DRAWINGS

FIG. 7 is a sample of an original pattern and the corresponding degraded patterns generated by using different degradation parameter values.

DESCRIPTION OF THE PREFERRED EMBODIMENT

Embodiments of the method and apparatus of the invention will be explained in detail below, with reference to the accompanying drawings.

Figure 1:
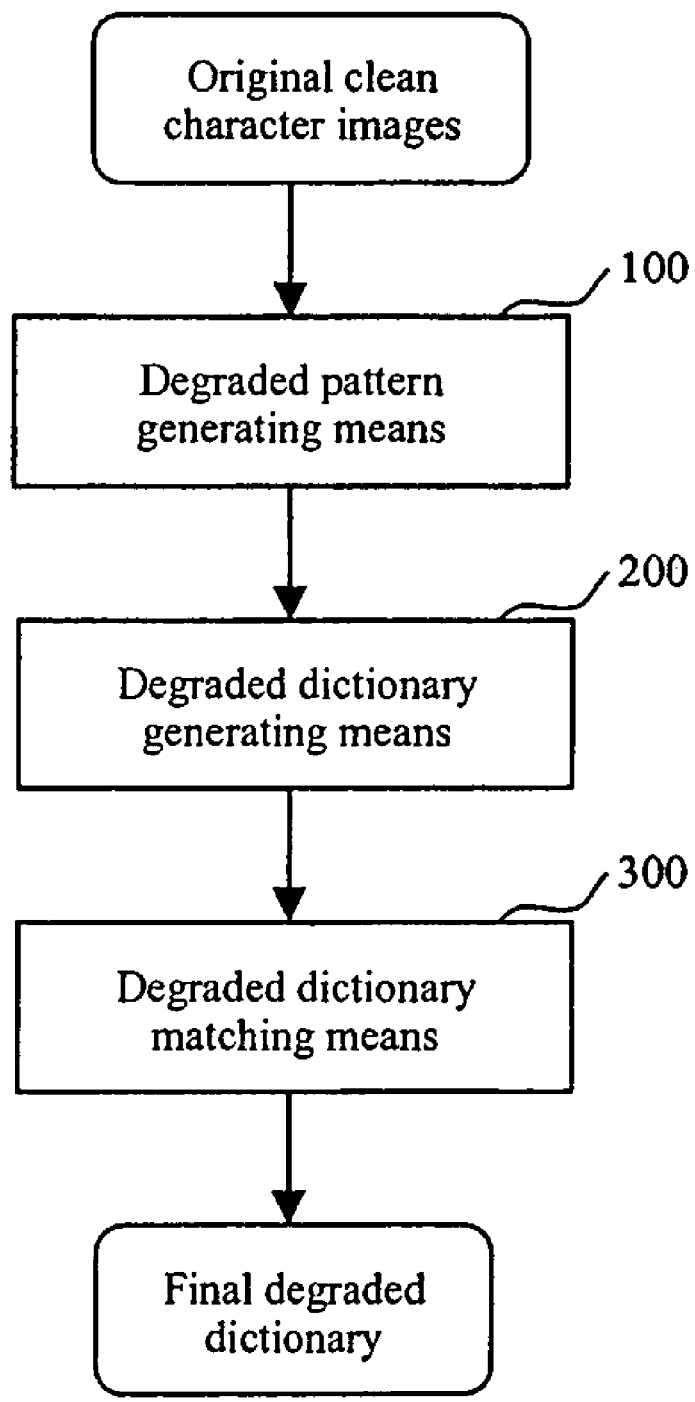
FIG. 1 is a block diagram of the degraded dictionary generation apparatus of the invention.

FIG. 1 is a block diagram of the degraded dictionary generation apparatus according to the invention. As shown in FIG. 1, the degraded dictionary generation apparatus according to the first embodiment of the invention comprises: a degraded pattern generating means 100, which generates a plurality of degraded patterns from an original character image, based on a plurality of degradation parameters; a degraded dictionary generating means 200, which generates a plurality of degraded dictionaries corresponding to the plurality of degradation parameters, based on the plurality of degraded patterns; and a dictionary matching means 300, which selects one of the plurality of dictionaries which matches the degradation level of a test sample set best, as the final degraded dictionary.

Each means of the degraded dictionary generation apparatus of the invention that has been mentioned above or that will be mentioned below can be consisted of appropriately programmed processors and relevant memories. According to the invention, one skilled in the art can construct such a degraded dictionary generation apparatus easily. Therefore, no further explanation on each means of this degraded dictionary generation apparatus will be given in consideration of clarity.

In the invention, degraded patterns of an original character image can be generated by any suitable method. Below, the operation of the degraded pattern generating means 100 is described by way of example.

Figure 2:
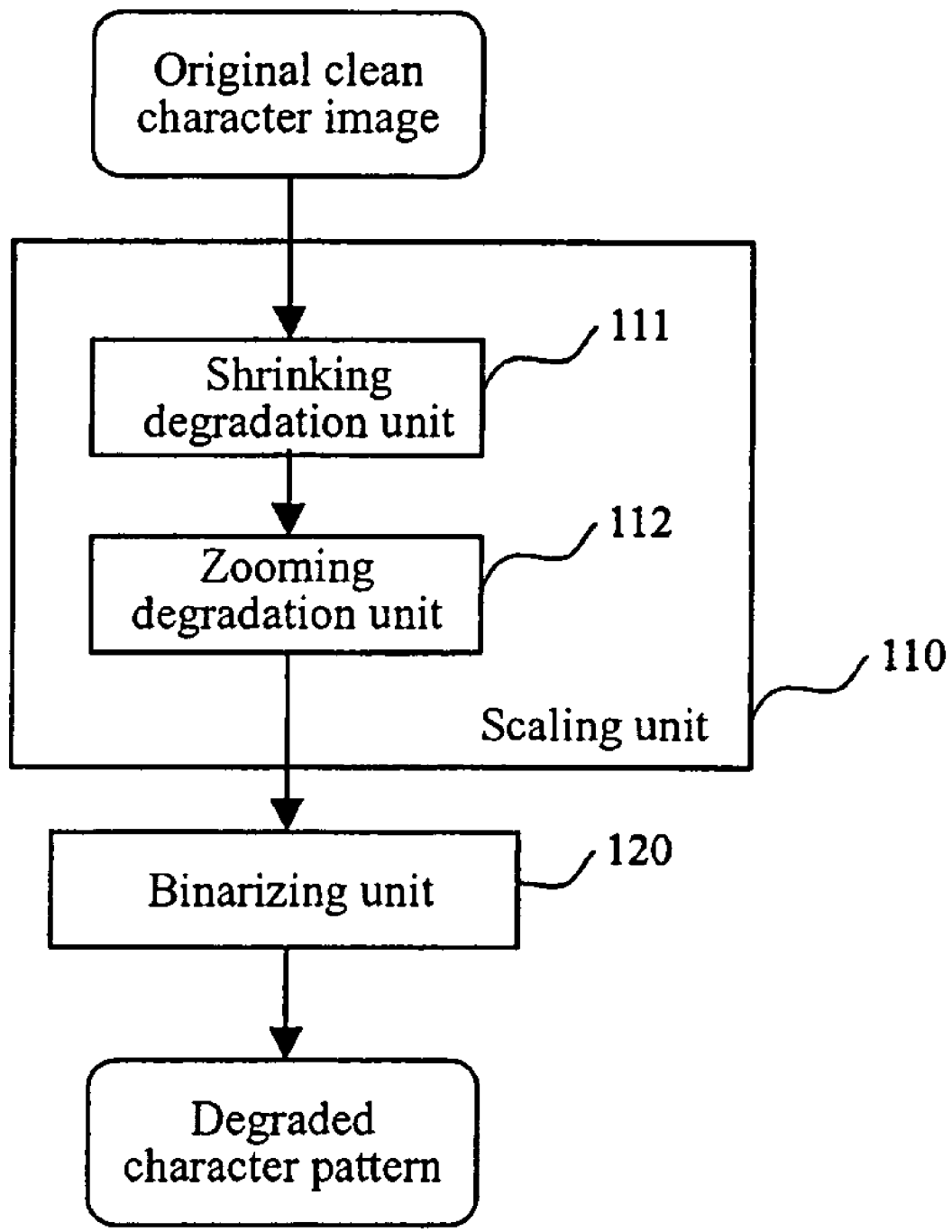
FIG. 2 is a processing flow chart of a degraded pattern generation means.

FIG. 2 schematically shows the structure of the degraded pattern generating means 100. As shown in FIG. 2, the degraded pattern generating means 100 comprises: a scaling unit 110, which performs a scaling process for an original character image, and a blurring process on the scaled character image; and a binarizing unit 120, which performs a binarization process for the scaled and blurred character image for the degraded patterns.

In this invention, the scaling unit 110 comprises a shrinking degradation unit 111 and a zooming degradation unit 112. The shrinking degradation unit 111 reduces an image, in which process some information is discarded. The zooming degradation unit 112 magnifies an image, in which process some information is added. Both of the two operations will deform the original image and introduce degradation to the image. Blurring is mainly caused by the defocusing of a camera lens which will also introduce degradation to the image.

The shrinking degradation unit 111 simulates the actual shrinking and blurring operation of video imaging, comprising a series of m shrinking and blurring operations. Every shrinking and blurring operation first shrinks the input image to a target size. Then a smoothing filter is used to add blurring effect on the shrinked image. The parameters of shrinking degradation include level of shrinking and blurring operations, target size of each shrinking operation, blurring parameters for each blurring operations and so on.

Figure 3:
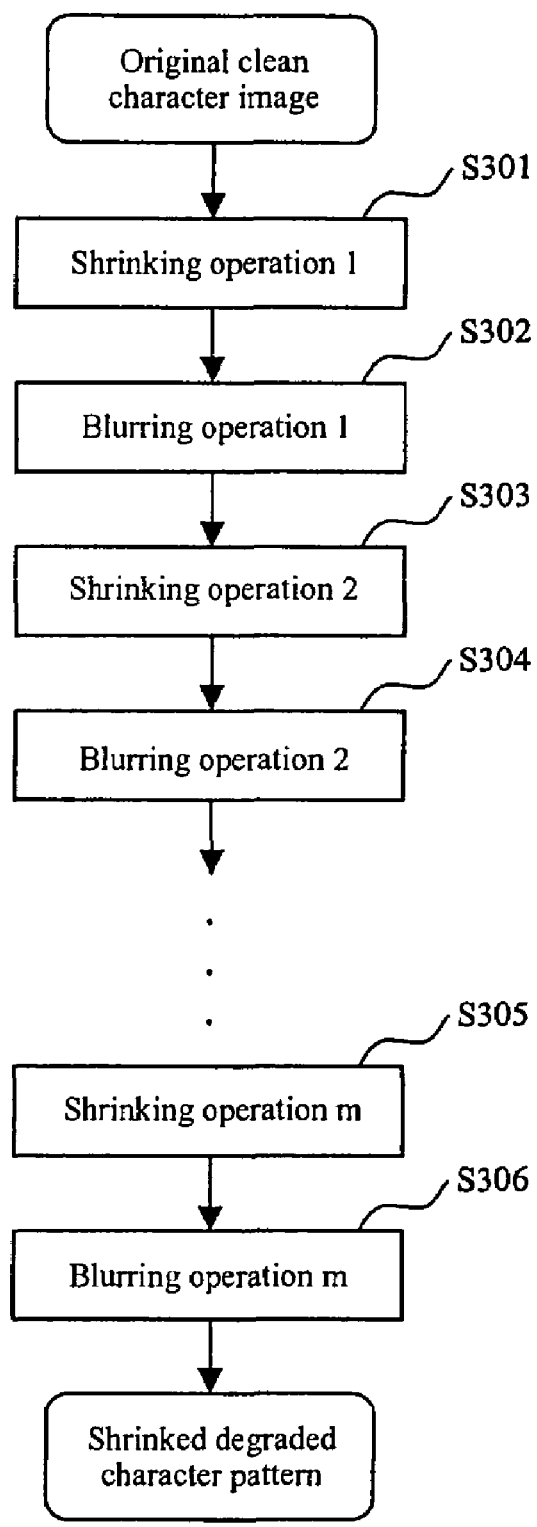
FIG. 3 is a processing flow chart of a shrinking degradation unit.

FIG. 3 shows a flow chart of process performed by the shrinking degradation unit 111 in FIG. 2. It contains m shrinking and blurring operations. An original character image is first processed by the $1^{st}$ shrinking operation (S301) and the $1^{st}$ blurring operation (S302), followed by the $2^{nd}$ shrinking operation (S303) and the $2^{nd}$ blurring operation (S304). This process continues until the final $m^{th}$ shrinking operation (S305) and the $m^{th}$ blurring operation (S306). The output of the shrinking degradation unit 111 is a shrinked degraded character image.

The zooming degradation unit 112 simulates the actual zooming and blurring operation of video imaging, comprising a series of n zooming and blurring operations. Every zooming and blurring operation first zooms the input image to a target size. Then a smoothing filter is used to add blurring effect on the zoomed image. The parameters of zooming degradation include level of zooming and blurring operations, target size of each zooming operation, blurring parameters for each blurring operations and so on.

Figure 4:
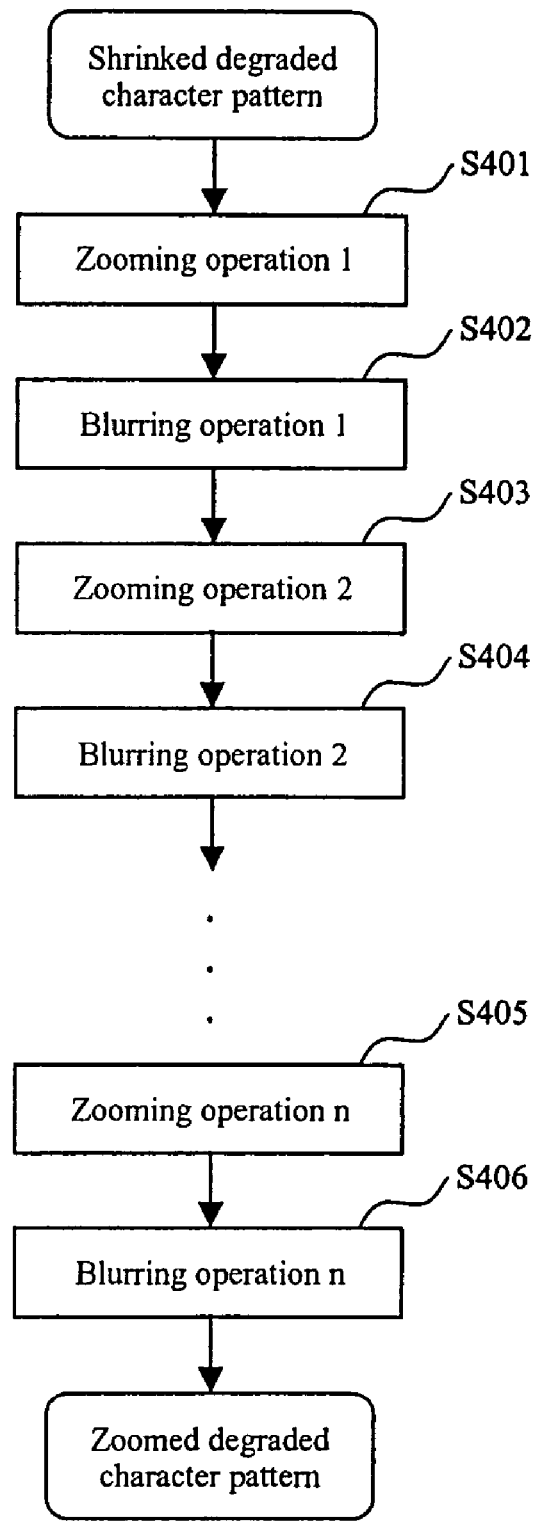
FIG. 4 is a processing flow chart of a zooming degradation unit.

FIG. 4 shows a flow chart of process performed by the zooming degradation unit 112 shown in FIG. 2. It contains n zooming and blurring operations. The input of the zooming degradation unit 112 is the shrinked degraded character image. It is first processed by the 1$^{st}$ zooming operation (S401) and the 1$^{st}$ blurring operation (S402), followed by the 2$^{nd}$ zooming operation (S403) and the 2$^{nd}$ blurring operation (S404). This process continues until the final n$^{th}$ zooming operation (S405) and the n$^{th}$ blurring operation (S406). The output of the zooming degradation unit 112 is a zoomed degraded character image.

The final blurred image is a grayscale image and thus needs a binarization step to get the final binary image. Therefore, the scaled and blurred image is binarized by using the binarizing unit 120. The output of the binarizing unit 120 is an image with pixel value of 0 or 255. The parameter of the binarizing process is the threshold used in binarization.

Scaling operations in the invention will be explained in more detail below.

Shrinking operation is a process of transforming a big sized image to a small sized image. Four shrinking methods can be used in our invention: nearest neighbor interpolation, linear interpolation, cubic interpolation, and super-sampling. Throughout the specification, following notations are used:

($x_D$, $y_D$)—pixel coordinates in the target image (integer value)
($x_S$, $y_S$)—the computed coordinates of a point in the source image that is mapped exactly to ($x_D$, $y_D$)
$S(x,y)$—pixel value (intensity) in the source image
$D(x,y)$—pixel value (intensity) in the target image In the nearest neighbor interpolation method, the pixel value in the target image is set to the value of the source image's pixel closest to the point.

$(x_S, y_S):D(x_D, y_D)=S(\text{round}(x_S), \text{round}(y_S))$.

The linear interpolation method uses source image intensities at four pixels which are closest to ($x_S$, $y_S$) in the source image, these four pixels are:

$(x_{S0}, y_{S0}), (x_{S1}, y_{S0}), (x_{S0}, y_{S1}), (x_{S1}, y_{S1})$:

$x_{S0}=\text{int}(x_S), x_{S1}=x_{S0}+1, y_{S0}=\text{int}(y_S), y_{S1}=y_{S0}+1$.

Figure 5:
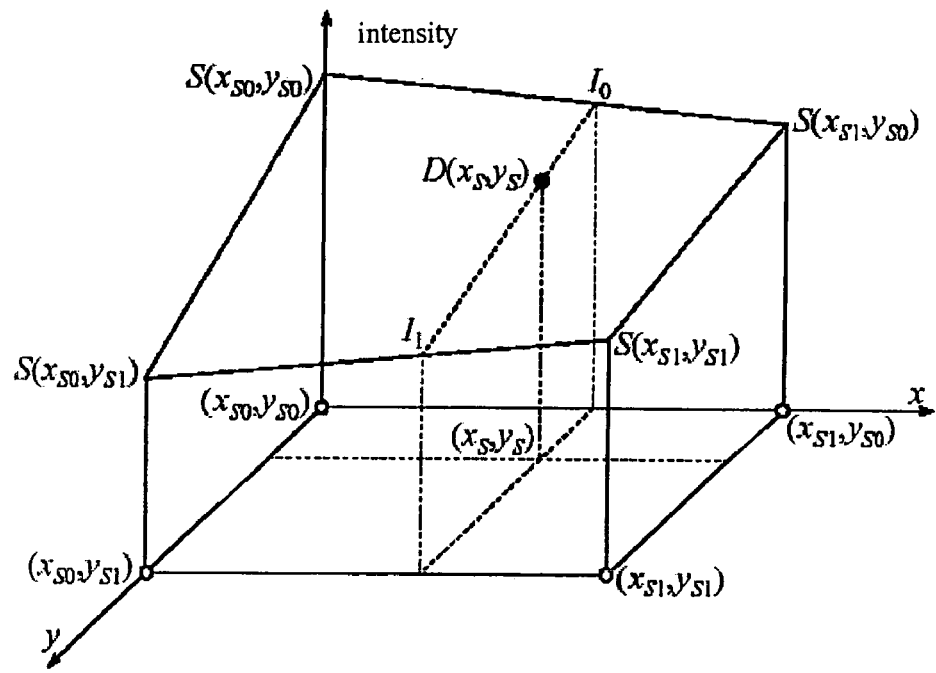
FIG. 5 is an illustration for linear interpolation.

As shown in FIG. 5, first the intensity values are interpolated along the x-axis to produce two intermediate results $I_0$ and $I_1$:

$I_0=S(x_S, y_{S0})=S(x_{S0}, y_{S0})*(x_{S1}-x_S)+S(x_{S1}, y_{S0})*(x_S-x_{S0})$ $I_1=S(x_S, y_{S1})=S(x_{S1}, y_{S1})*(x_{S1}-x_S)+S(x_{S1}, y_{S1})*(x_S-x_{S0})$

Then, the target intensity $D(x_D, y_D)$ is computed by interpolating the intermediate values $I_0$ and $I_1$ along the y-axis:

$D(x_D, y_D)=I_0(y_{S1}-y_S)+I_1(y_S-y_{S0})$.

Figure 6:
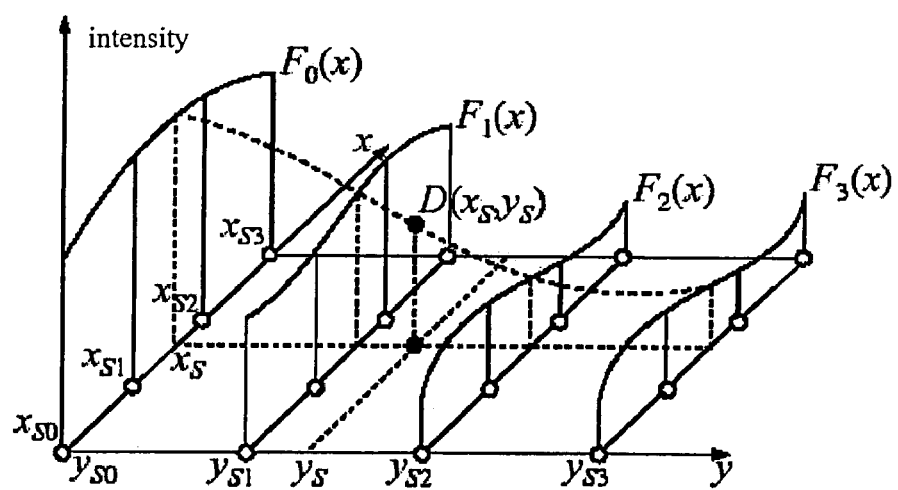
FIG. 6 is an illustration for cubic interpolation.

As shown in FIG. 6, the cubic interpolation method uses source image intensities at sixteen pixels in the neighborhood of the point ($x_S$, $y_S$) in the source image:

$x_{S0}=\text{int}(x_S)-1\ x_{S1}=x_{S0}+1\ x_{S2}=x_{S0}+2\ x_{S3}=x_{S0}+3$ $y_{S0}=\text{int}(y_S)-1\ y_{S1}=y_{S0}+1\ y_{S2}=y_{S0}+2\ y_{S3}=y_{S0}+3$.

First, for each $Y_{Sk}$, the algorithm determines four cubic polynomials $F_0(x)$, $F_1(x)$, $F_2(x)$, and $F_3(x)$:

$F_k(x)=a_k x_3+b_k x_2+c_k x+dk\ 0 \leq k \leq 3$ such that $k(x_{S0})=S(x_{S0}, y_{Sk})$, $F_k(x_{S1})=S(x_{S1}, y_{Sk})$, $F_k(x_{S2})=S(x_{S2}, y_{Sk})$, $F_k(x_{S3})=S(x_{S3}, y_{Sk})$.

In FIG. 6 these polynomials are shown by solid curves. Then the algorithm determines a cubic polynomial $F_y(y)$ such that $F_y(y_{S0})=F_0(x_S), F_y(y_{S1})=F_1(x_S), F_y(y_{S2})=F_2(x_S), F_y(y_{S3})=F_3(x_S)$.

The polynomial $F_y(y)$ is represented by the dashed curve in FIG. 6. Finally, the target intensity $D(x_D, y_D)$ is set to the value $F_y(y_S)$.

The super-sampling algorithm is as follows:

(1) Divide the source image's rectangular ROI (or the whole image, if there is no ROI) into a number of equal rectangles, each rectangle corresponding to some pixels in the target image. Note that each source pixel is represented by a 1×1 square.

(2) Compute a weighted sum of source pixel values for all pixels that are contained in each rectangle or have a non-zero intersection with the rectangle. If a source pixel is fully contained in the rectangle, that pixel's value is assigned with weight 1. If the rectangle and the source pixel's square have an intersection area of $\alpha<1$, that pixel's value is assigned with weight $\alpha$. Each source pixel intersecting with the rectangle is computed like this.

(3) To compute the pixel value in the target image, divide the weighted sum of step (2) by the rectangle area.

Zooming is an inverse process of shrinking. It transforms a small sized image to a big sized image. Three zooming methods can be used in our invention: nearest neighbor interpolation, linear interpolation, and cubic interpolation. Note that in our invention, the size of final zoomed image should be the same as the size of the original clean character image.

Blurring operation in shrinking degradation unit adds blurring effect on the shrinked image. Blurring operation in zooming degradation unit adds blurring effect on the zoomed image. Gaussian filter can be used to add blurring effect to the scaled character image. The continue form of Gaussian filter is:

$G(x, y)=\exp((x^2+y^2)/2/\sigma^2)$

The filter is digitized into a 7*7 mask region and convolved with the scaled image to get the blurred image.

Figure 7:
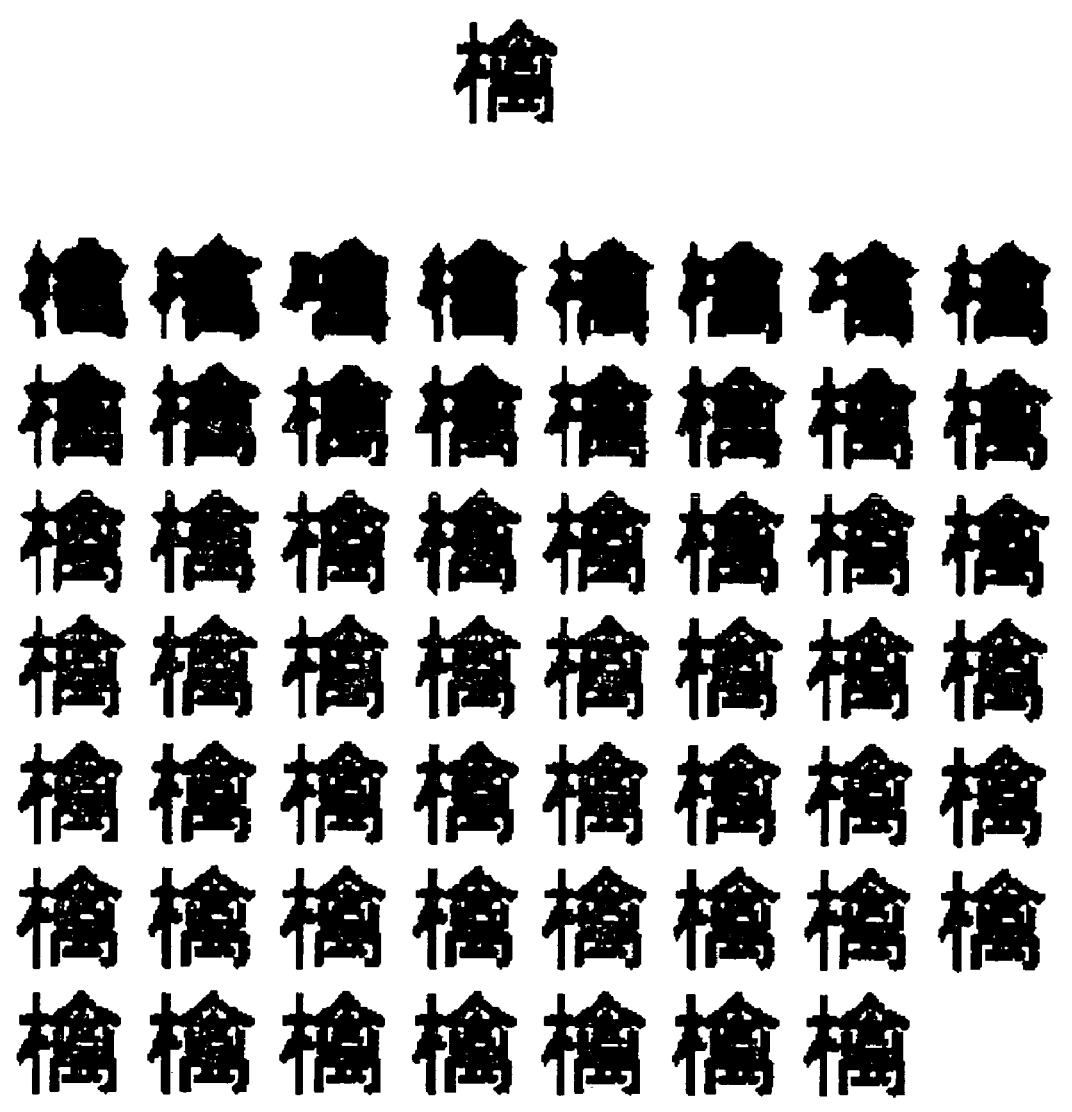

FIG. 7 is an example of generated degraded patterns. The upper image is an original binary pattern. The lower images are generated degraded character images. The degraded patterns are generated using level 1 shrinking operation and level 2 zooming operation. The size of the original character and that of the generated degraded images are all 64*64. From top-left to bottom-right, the shrinked size of shrinking operation increases from 20 to 64. The smaller the shrinked size is, the more degraded the image is.

As mentioned above, in the invention, the scaling unit 110 comprises the shrinking degradation unit 111 and the zooming degradation unit 112. However, it is understandable that the scaling unit 110 can only include either of the shrinking degradation unit 111 or the zooming degradation unit 112. Furthermore, there is no restriction on the times of shrinking degradation and zooming degradation. Particularly, shrinking degradation and/or zooming degradation can be processed only once.

After scaling operation and blurring operation, the generated degraded patterns are used to make degraded dictionaries by a feature extraction method. The degraded dictionary generating means according to the invention further includes a feature extracting means 400 for extracting features from an input character pattern. The feature extracting means 400 can perform any existing feature extraction method. For example, methods in the following references can be adopted, which will not be described in detail herein:

"Modified Quadratic Discriminant Functions and the Application to Chinese Character Recognition", FUMITAKA KIMURA, KENJITAKASHINA, SHINJI TSURUOKA, and YASUJI MIYAKE, IEEE, PAMI vol. PAMI-9, No. 1, January 1987

"Character recognition: a review", Pattern Recognition, Govindan, V. K. and Shivaprasad, A. P., Vol. 23, No. 7, pp. 671-683, 1990.

Hence, by varying every degradation parameters, lots of degradation patterns can be generated for establishing a plurality of degraded dictionaries corresponding to various degradation parameters.

In the invention, after generating the plurality of degraded dictionaries corresponding to various degradation parameters, the most suitable degraded dictionary is selected by using a test sample set corresponding to practical application situation of the degraded dictionary.

Figure 8:
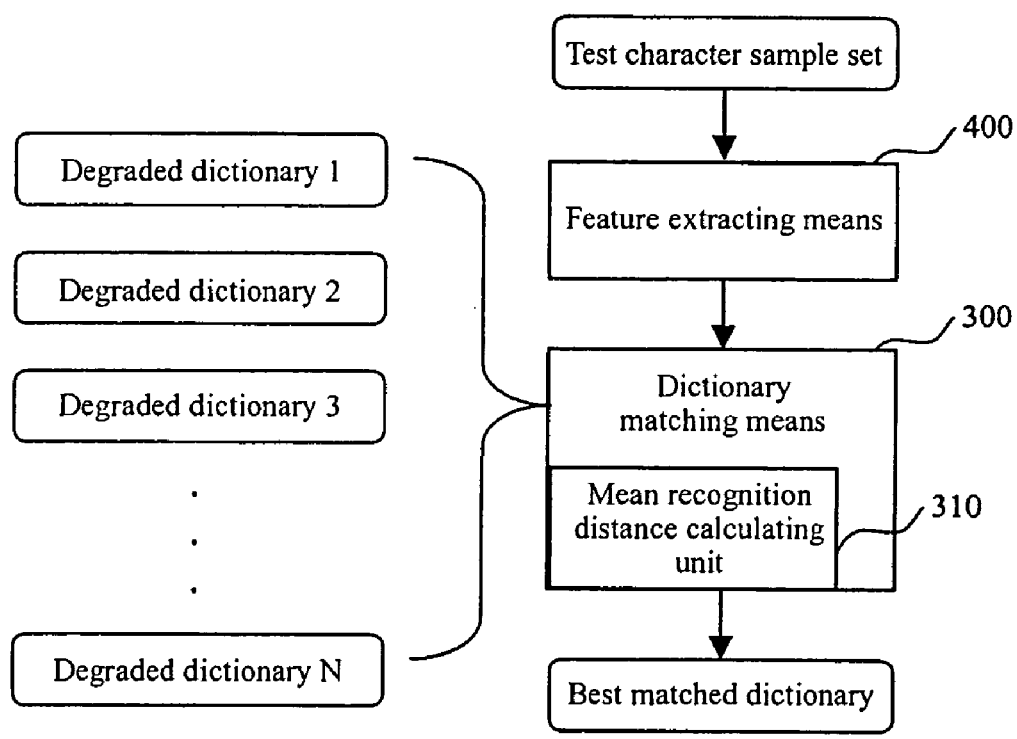
FIG. 8 is a sketch map of the dictionary matching means.

As shown in FIG. 8, first a test sample set is determined according to practical application situation of the degraded dictionary. A feature extracting means 400 is used to extract the feature of each test sample. As shown in the figure, an dictionary matching means 300 has a mean recognition distance calculating unit 310 for calculating mean recognition distances between each of the degraded dictionaries and the test sample set. Thus the best matched degraded dictionary can be selected based on the calculation results of the mean recognition distance.

Figure 9:
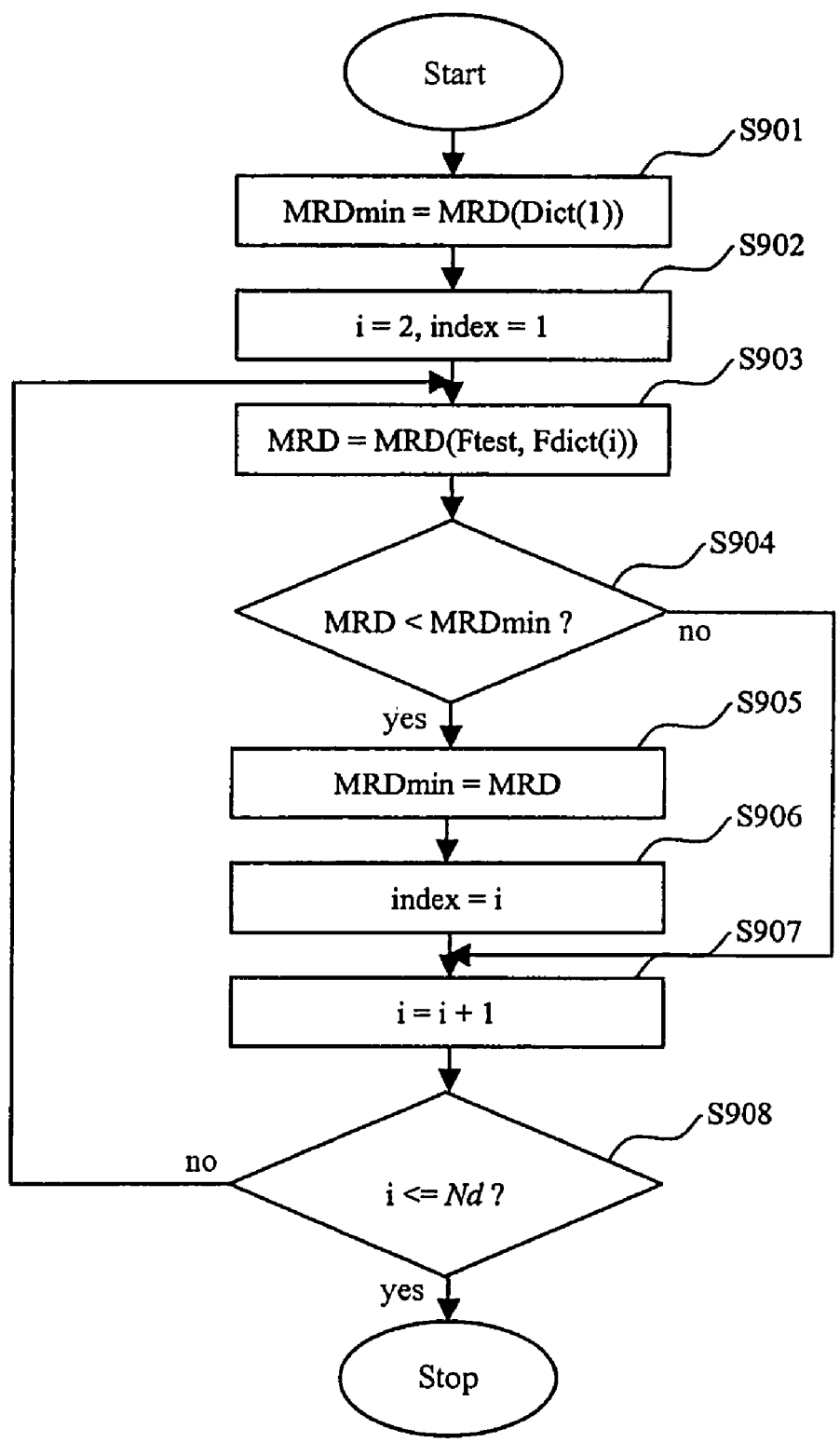
FIG. 9 is a detailed flow chart of the process of dictionary matching.

FIG. 9 is a flow chart of the process performed by the dictionary matching means 300 in FIG. 8. Herein, the mean recognition distance calculation unit 310 calculates the mean recognition distance (MRD) between the test sample set (Ftest) and the $1^{st}$ degraded dictionary (Dict(1)) (S901). The calculated value is stored as a minimum MRD (MRDmin). Starting from the $2^{nd}$ degraded dictionary (Dict(2)) (S902), the MRD is calculated again (S903). If the calculated value is smaller than the original MRDmin (S904), the original MRDmin is updated by the new MRD value and the index of the dictionary is recorded (S905, S906). The process is repeated until all dictionaries are calculated and compared (S907, S908). The final output of the dictionary matching means 300 is the index of the dictionary with minimum MRD.

The mean recognition distance between the test sample set and a dictionary is calculated as follows:

First, the distance between the test sample set i and one dictionary j is calculated as Equation (1):

$$D_j(i)=\min(\text{Dist}(i,k))\ k=1,2,\ldots,m \quad (1)$$

Where i is the index of the test sample. j is the index of dictionary. Dist( ) is a calculated distance between two samples. k is the index of samples included in the dictionary. m is the number of samples included in the dictionary.

Then, the mean recognition distance between the test sample set and a dictionary j is obtained as the average of the recognition distances of every sample in the test set with the dictionary as Equation (2):

$$D_j=\Sigma D_j(i)/m \quad (2)$$

Figure 10:
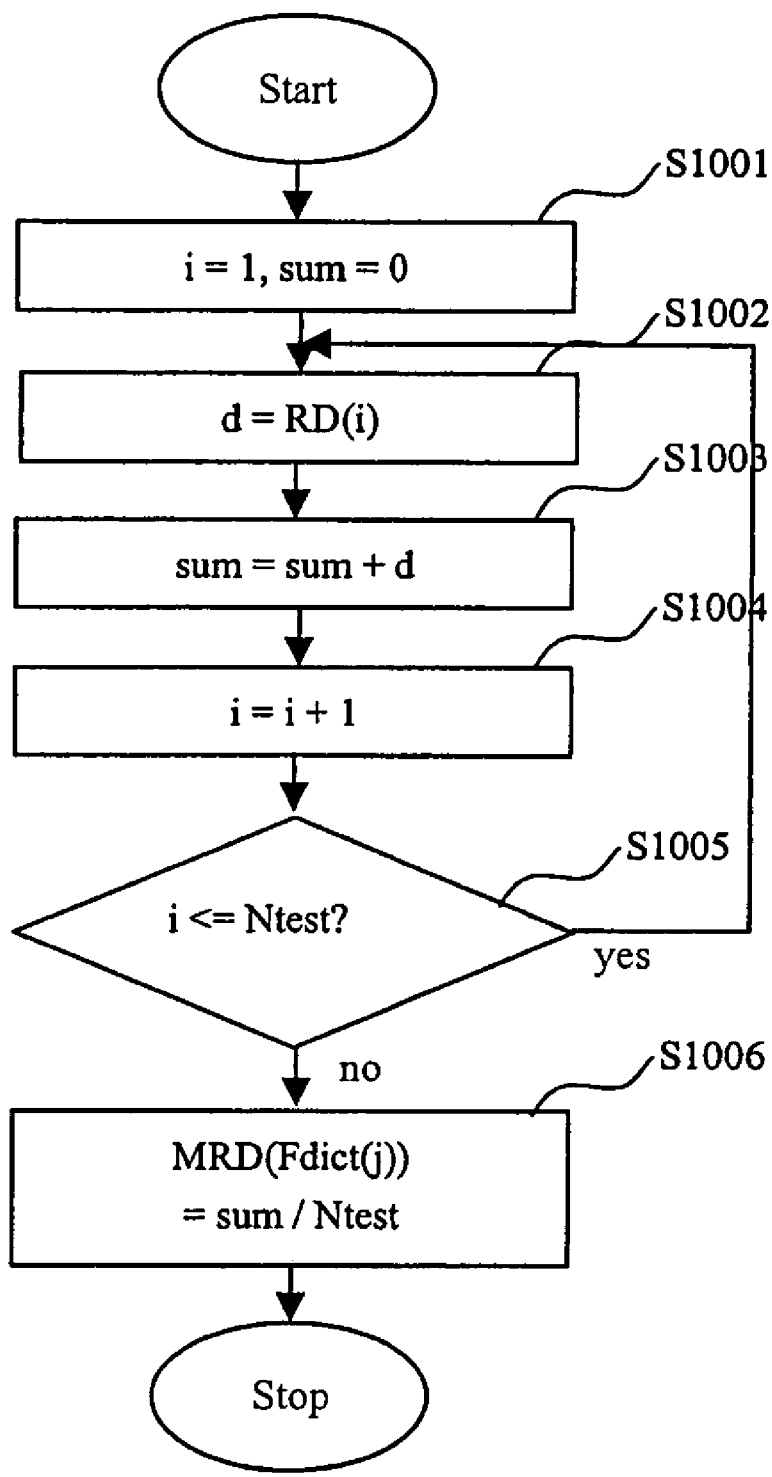
FIG. 10 is a processing flow chart of the mean recognition distance calculating means.

FIG. 10 is a flow chart of the process performed by the mean recognition distance calculating unit 310. For a test sample set, starting from the $1^{st}$ test sample (S1001), the recognition distance between current test sample and the $j^{th}$ dictionary is calculated (S1002). Then the calculated value is summed up (S1003). The process is repeated until the recognition distances of all samples are calculated and summed (S1004, S1005). The mean recognition distance between a given test sample set and the $j^{th}$ dictionary is measured as the average of the recognition distances of all test samples (S1006).

Figure 11:
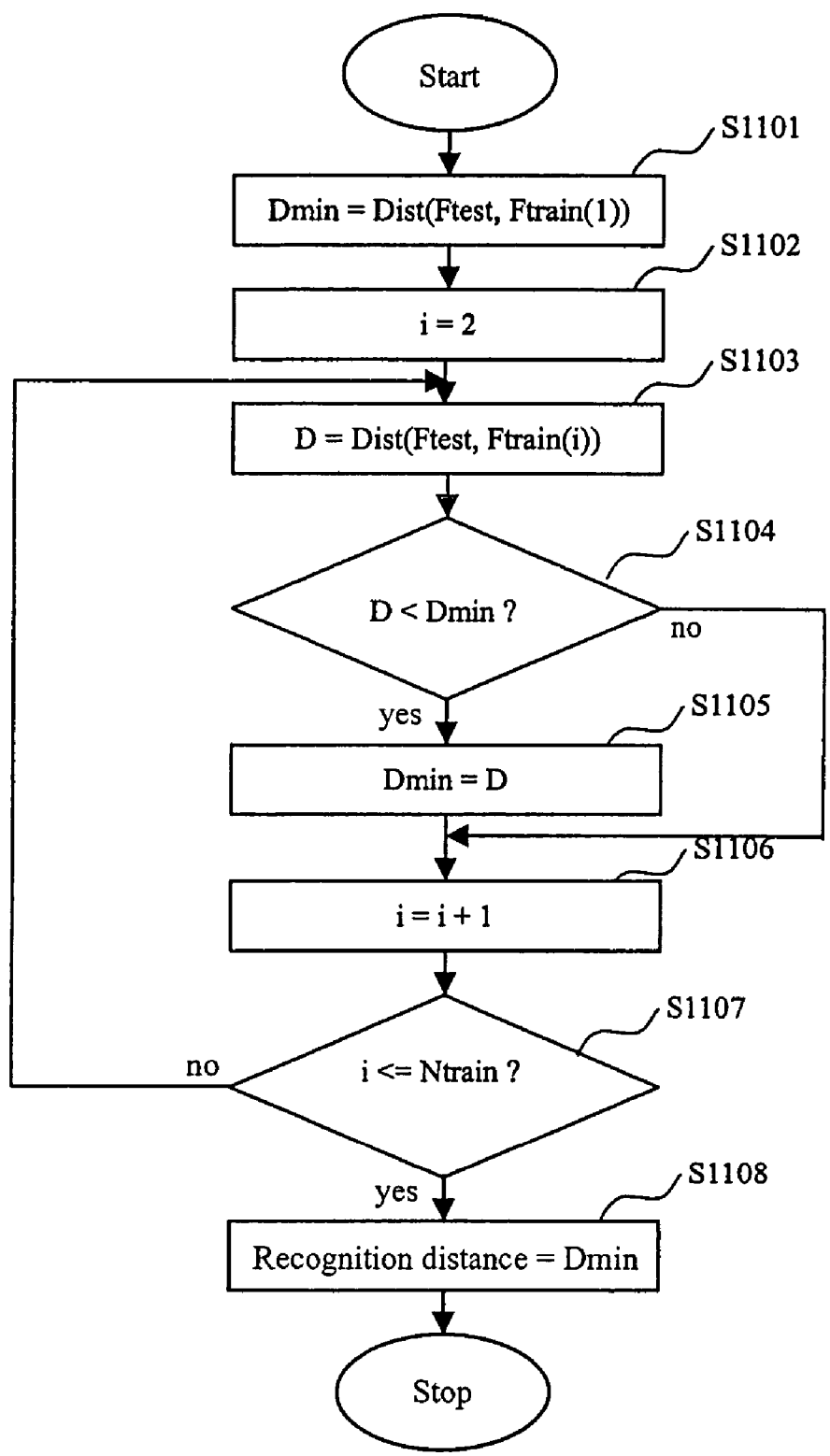
FIG. 11 is a flow chart of the process of recognition distance calculation.

FIG. 11 is a flow chart of recognition distance calculation process. First the distance between the test sample and the first sample in the dictionary is calculated and stored as Dmin (S1101). Then starting from the $2^{nd}$ sample in the dictionary (S1102), the distance between current dictionary sample and the test sample is calculated (S1103). If the calculated distance is smaller than Dmin (S1104), the value in Dmin is replaced by current distance value (S1105). The process repeats until all dictionary samples are calculated (S1106, S1107). The final output is the minimum distance value Dmin (S1108).

Hereby, the most suitable degraded dictionary is selected according to the test sample set corresponding to practical application situation of the degraded dictionary. In addition, a degradation level of the test sample set can be determined by using the dictionary matching means 300 in the invention.

In practical applications, lots of degraded dictionaries are generated according to different levels of degradation, or different values of degradation parameters. All samples in one degraded dictionary have the same degradation parameter values. For a given test sample set, the dictionary matching means 300 selects one most suitable degraded dictionary. The degradation level of the matched degraded dictionary is the same as the degradation level of the test sample set. Thereby, the degradation level of the test sample set can be determined by using the dictionary matching means 300.

Figure 12:
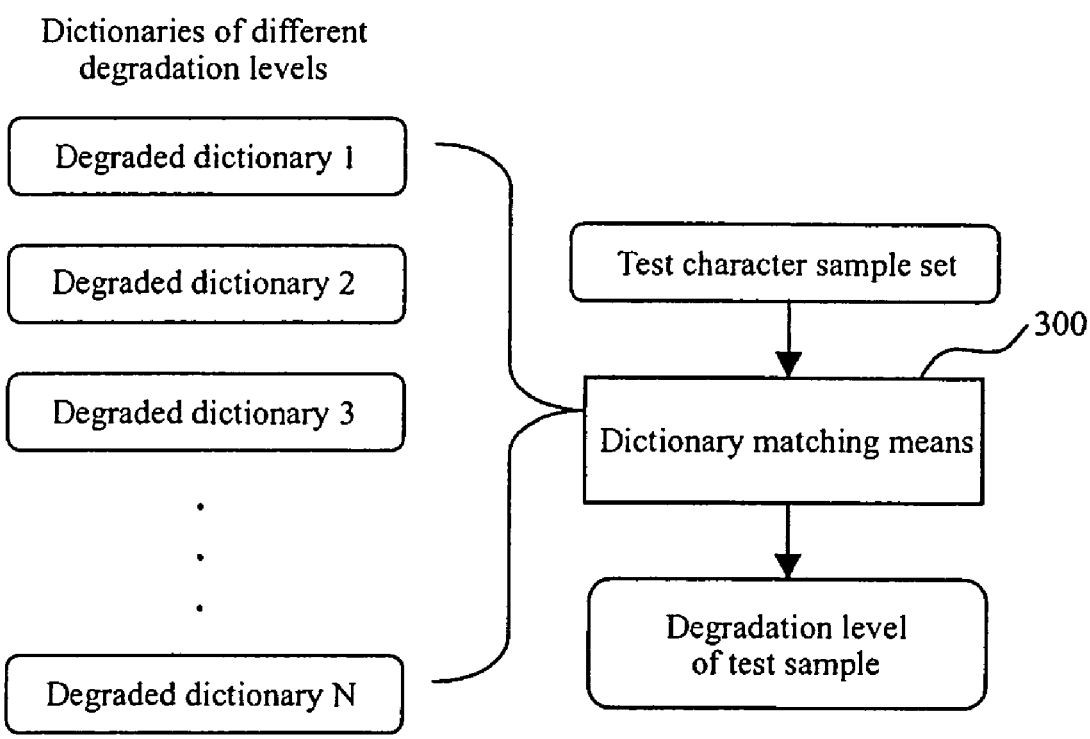
FIG. 12 is a flow chart of the process of degradation level estimation.

FIG. 12 is a flow chart of determining the degradation level of a test sample set. First a group of N degraded dictionaries are prepared. For a test character sample set, the dictionary matching means 300 selects the best matched one from these N degraded dictionaries. The degradation level of the matched degraded dictionary being selected is regarded as the degradation level of the test sample set.

Furthermore, in the invention, the font type of the test sample set can be determined by using the dictionary matching means 300.

In practical application of font recognition, if the font types of samples are different, then different dictionaries will be made. All samples in one dictionary have the same font type. For a given test sample set, the dictionary matching means will select one best matched dictionary. The font type of the matched dictionary is the same as the font type of the test sample set.

Figure 13:
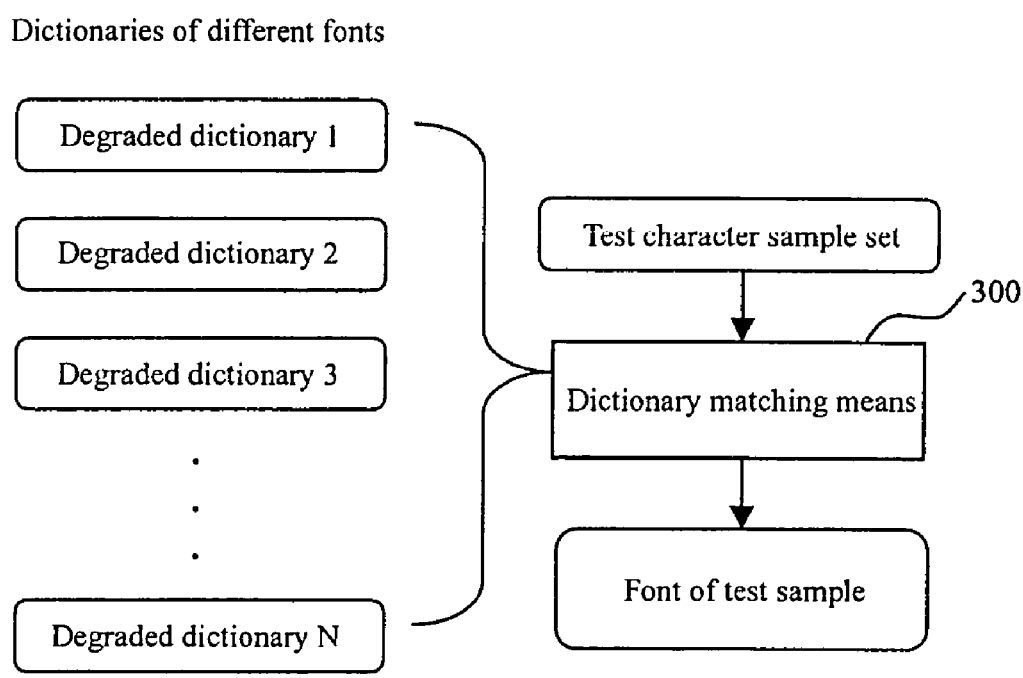
FIG. 13 is a flow chart of the process of font recognition.

FIG. 13 shows a flow chart of determining the font type of a test sample set according to the invention. First, a group of N font dictionaries of different font types are prepared. For a test character sample set, the dictionary matching means 300 selects the best matched one from these N font dictionaries. The font type of the matched dictionary being selected is regarded as the font type of the test sample set.

In practical application, since different font types can be regarded as different levels of degradation, if a test sample set contains a number of fonts, the dictionary matching means 300 may make errors. Therefore, it is necessary to ensure that all samples in the test sample set are of the same font type.

Accordingly, a function of detecting the font environment of a test sample set is provided in the invention. For a specific sample set, it can determine whether a given sample set contains only one font type (single font environment) or more than one font type.

Figure 14:
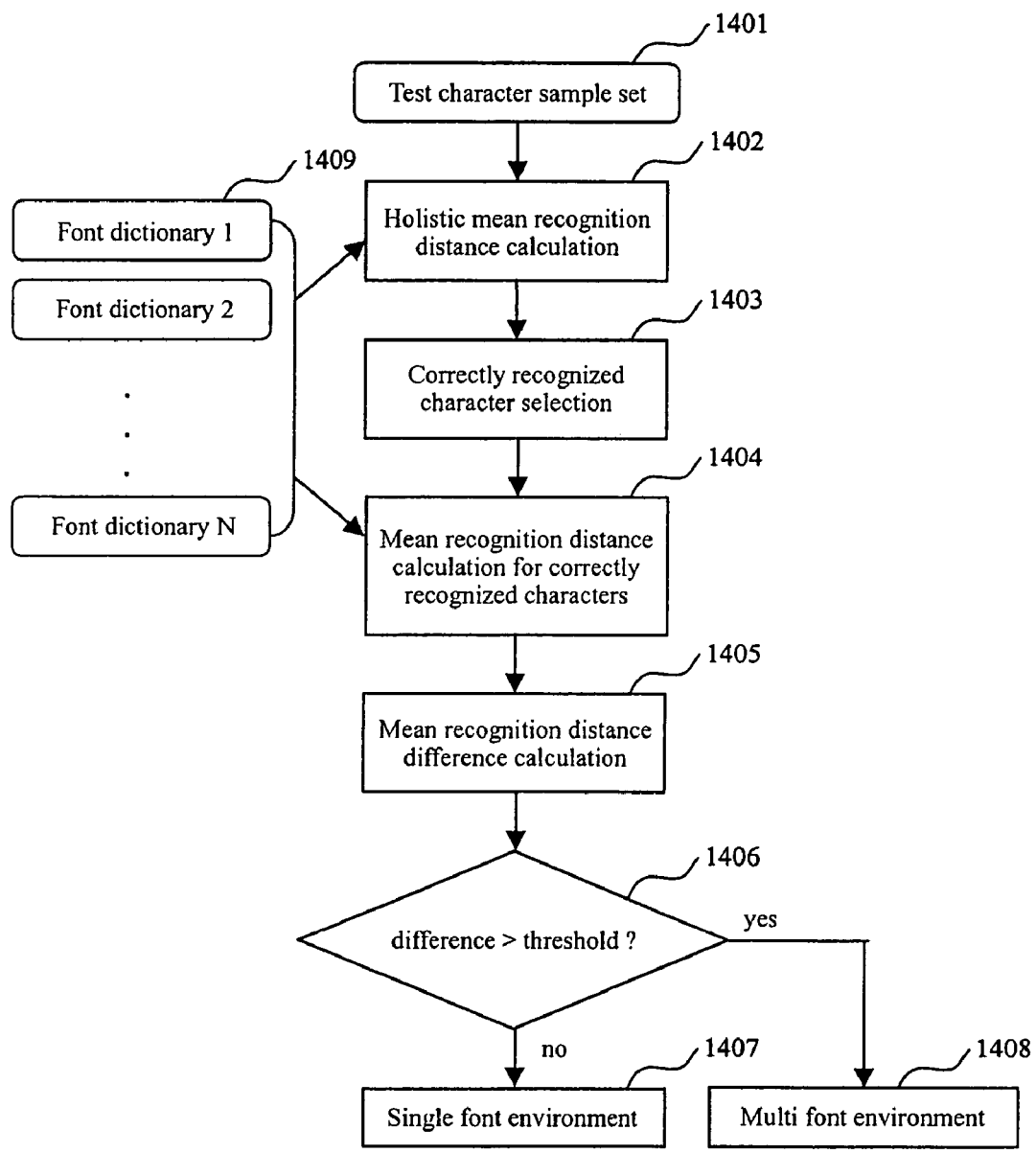
FIG. 14 is a flow chart of the process of single font environment detection.

FIG. 14 is a processing flow chart of font environment detection. As shown, first, a group of N font dictionaries of different font types are prepared in advance. For each of the dictionaries, mean recognition distance is calculated using all test samples (1402). Then an optical character recognition method is used to recognize the test sample set and the correctly recognized character samples are selected (1403). After that, a second mean recognition distance for each of the N font dictionaries is calculated using the correctly recognized characters (1404). The difference of these two mean recognition distances is calculated (1405). If the difference is larger than a predefined threshold (1406), the test sample set contains more than one font (1408). Otherwise, the test sample set contains only one font and is a single font environment (1407).

Hereby, the dictionary matching means 300 can select the best matched dictionary by using the test sample set which includes only one font.

The invention is described with respect to a preferred embodiment above. However, it is understandable that the invention is not limited to specific details mentioned above. Forms and details of the degraded dictionary generation method and apparatus of the invention can be varied within the scope defined by the claims.

What is claimed is:

1. A method for generating a degraded dictionary, comprising:
    generating a plurality of degraded patterns from an original character image, based on a plurality of degradation parameters;
    establishing a plurality of degraded dictionaries which correspond to the plurality of degradation parameters, respectively, by extracting features of the degraded patterns; and
    selecting one of the plurality of dictionaries, which matches the degradation level of a test sample set best, as a final degraded dictionary.

2. The method of claim 1, wherein generating the degraded patterns comprises:
    subjecting the original character image to a scaling process;
    subjecting the scaled character image to a blurring process; and
    subjecting the blurred image to a binarization process.

3. The method of claim 2, wherein each of the scaling process and the blurring process are conducted more than one time.

4. The method of claim 1, wherein selecting the degraded dictionary comprises:
    extracting features of the test sample;
    calculating mean recognition distances between each of the plurality of degraded dictionaries and the test sample set, based on the extracted features; and
    selecting one of the plurality of degraded dictionaries with the smallest mean recognition distance from the test sample set as the final degraded dictionary.

5. The method of claim 4, further comprising:
    determining a degradation level of the test sample set based on the degradation level of the selected final degraded dictionary.

6. The method of claim 1, further comprising:
    determining whether the test sample set includes only one font; and
    selecting the final degraded dictionary by using the test sample set which includes only one font.

7. The method of claim 6, further comprising:
    preparing a plurality of font dictionaries of respective, different fonts;
    calculating mean recognition distances between each of the plurality of font dictionaries and the test sample set;
    selecting correctly recognized samples from the test sample set;
    calculating mean recognition distances between the correctly recognized samples and each of the plurality of font dictionaries; and
    determining whether the test sample set includes only one font based on the mean recognition distances.

8. An apparatus for establishing a degraded dictionary, comprising:
    degraded pattern generating means for generating a plurality of degraded patterns from an original character image, based on a plurality of degradation parameters;
    degraded dictionary generating means for generating a plurality of degraded dictionaries based on the plurality of degradation parameters, respectively; and
    dictionary matching means for selecting one of the plurality of dictionaries which matches the degradation level of a test sample set best, as the final degraded dictionary.

9. The apparatus of claim 8, wherein the degraded pattern generating means further comprises:
    scaling means for performing a scaling process for the original character image, and for performing a blurring process on the scaled character image; and
    binarizing means for performing a binarization process for the scaled and blurred character image.

10. The apparatus of claim 9, wherein the scaling means performs the scaling process for the original character image more than one time, and performs the blurring process for the scaled character image more than one time.

11. The apparatus of claim 8, further comprising:
    feature extracting means for extracting features from an input image pattern, wherein the degraded dictionary generating means generates the plurality of degraded dictionaries from the features extracted by the feature extracting means.

12. The apparatus of claim 8, further comprising:
    mean recognition distance calculating means for calculating a mean recognition distance between a dictionary and a test sample set,
    wherein the mean recognition distance calculating means calculates mean recognition distances between each of the plurality of degraded dictionaries and the test sample set based on the features extracted by the feature extracting unit, and
    the dictionary matching means selects one of the plurality of degraded dictionaries with the smallest mean recognition distance from the test sample set as the final degraded dictionary.

* * * * *

UNITED STATES PATENT AND TRADEMARK OFFICE
CERTIFICATE OF CORRECTION

PATENT NO. : 7,480,408 B2  Page 1 of 1
APPLICATION NO. : 11/200194
DATED : January 20, 2009
INVENTOR(S) : Sun Jun et al.

It is certified that error appears in the above-identified patent and that said Letters Patent is hereby corrected as shown below:

On the Title page item (30), (Foreign Application Priority Data), Line 1, change "2004 1 0585882" to --2004100585882--.

Signed and Sealed this

Thirty-first Day of March, 2009

JOHN DOLL
*Acting Director of the United States Patent and Trademark Office*